United States Patent [11] 3,620,781

[72] Inventor Ronald C. Garvie
 Big Flats, N.Y.
[21] Appl. No. 848,087
[22] Filed Aug. 6, 1969
[45] Patented Nov. 16, 1971
[73] Assignee Corning Glass Works
 Corning, N.Y.

[54] PARTIALLY STABILIZED ZIRCONIA REFRACTORY
 10 Claims, No Drawings

[52] U.S. Cl. .................................................... 106/57
[51] Int. Cl. ........................................... C04b 35/48
[50] Field of Search ................................ 106/57; 264/66

[56] References Cited
 UNITED STATES PATENTS

| | | | |
|---|---|---|---|
| 2,335,325 | 11/1943 | Wainer | 106/57 |
| 2,937,102 | 5/1960 | Wagner | 106/57 |
| 3,175,919 | 3/1965 | Smoot et al. | 106/57 |
| 3,522,064 | 7/1970 | Valdsaar | 106/57 |

Primary Examiner—James E. Poer
Attorneys—Clarence R. Patty, Jr. and Richard N. Wardell ABSTRACT: Body consisting essentially of $ZrO_2$ and CaO with CaO being 2–5 wt. percent of the body. Microstructure consists essentially of cubic grains collectively constituting volumetrically the major phase, smaller primary monoclinic zirconia grains randomly dispersed substantially at grain boundaries between adjacent cubic grains, and, as a principal new feature effecting increased strength and elasticity properties, extremely finely divided precipitate of monoclinic zirconia dispersed intragrangularly throughout the cubic grains and being substantially smaller than the primary monoclinic zirconia grains. Cubic grains composed essentially of a solid solution of $ZrO_2$ in a compound $CaZr_4O_9$.

Manufacturing process comprises preparing batch material of prescribed composition, heating the material at firing temperature of at least 1,800° C. that causes sintering or melting of the material, cooling fired material to an annealing temperature of 900°–1,700° C. and maintaining it at the annealing temperature for at least about one day and thereafter continuing cooling of the material. Product is either sintered or fusion-cast body. Batch material can be either unfused or fused finely divided particles. Unfused batch can be either unreacted or prereacted raw materials. For optimum density from unreacted raw material batch, it is heated, prior to molding, to prefiring temperature of 900°–1,300° C. for at least about one day. CaO can be provided in batch by heat decomposable compound whose solid decomposition product is substantially all CaO, e.g. calcium acetate monohydrate.

PARTIALLY STABILIZED ZIRCONIA REFRACTORY

BACKGROUND OF THE INVENTION

This invention relates to improvements in refractories and other bodies of zirconia partially stabilized with the inclusion of small amounts of calcia.

Zirconia is thermally unstable in that it undergoes a reversible polymorphic transformation from monoclinic to tetragonal structure in the range of about 900–1200° C., which is accompanied by a relatively large volume change (about 7–9 percent) that commonly causes fracturing and disintegration of a body made of such material. As a result, certain additives (or stabilizers) forming thermally stable cubic solid solutions and/or compounds with zirconia have been mixed and reacted with zirconia to overcome the disasterous volume change. Exemplary of such additives is calcia (also known as calcium oxide or CaO). Bodies are either wholly or partially stabilized depending upon whether the amount of additive is sufficient to react and form the cubic phase with all or part of the monoclinic-tetragonal zirconia crystals. Zirconia partially stabilized with calcia conventionally contains CaO in an effective amount less than 6 weight percent sufficient to yield cubic crystalline grains as the major microstructural phase by volume while the balance of the material remains as primary monoclinic zirconia grains (below the transformation temperature range) randomly dispersed substantially at the grain boundaries between adjacent cubic grains and generally of substantially smaller average grain size than that of the cubic grains. According to recent work, I have confirmed that the cubic grains are composed essentially of a solid solution of $ZrO_2$ in a compound of the formula $CaZr_4O_9$.

Refractoriness of the partially stabilized zirconia is one of the principal attributes making the material attractive for industrial purposes. However, its usefulness is limited by very modest strength and elastic properties, viz modulus of rupture in flexure (MOR) and Young's Modulus (also known as modulus of elasticity—MOE). Moreover, when the material is subjected to thermal shock, both of these properties are degraded to unsuitable levels for many purposes.

SUMMARY OF THE INVENTION

I have now discovered a new body of zirconia partially stabilized with 2–5 weight percent (preferably 3–4 weight percent) calcia (based on the total weight of the body) that has a significantly improved microstructure, and the method of making it, whereby the body is characterized by greatly enhanced strength (MOR) and elastic (MOE) properties. It is similar to the old type of partially stabilized body insofar as it also consists essentially of the cubic grains as the major microstructural phase, by volume, and intergranular primary monoclinic zirconia grains of substantially smaller average grain size than that of the cubic grains. However, it principally differs from the old type of body by containing a new, additional, essential, microstructural constituent not present in the latter body, which constituent is an extremely finely divided precipitate of monoclinic zirconia dispersed intragranularly throughout the cubic grains. At least from the presently preferred manner of carrying out the invention, the precipitate is vermicular with a tendency toward forming a structural pattern having the appearance of a Widmanstatten structure, which is more commonly known in metallic alloys, and has an average grain size substantially smaller (at least by a factor of 10) than the average grain size of the primary monoclinic zirconia grains (e.g. about 0.1–2 micron vs. about 10–20 microns, respectively).

By virtue of the improved, precipitate-containing microstructure, bodies according to this invention can be provided with not only greatly higher values of MOR and MOE, but also, after being severely thermally shocked, with values of MOR and MOE superior to those of the older type, conventional zirconia bodies partially stabilized with CaO that have not even been subjected to thermal shock. The only stabilizer combination with zirconia that I have found will yield the noted unique microstructure and resultant property benefits is that of calcia with zirconia.

The process for making a partially stabilized zirconia body of this invention, broadly speaking, employs the basic steps of making the older type, conventional bodies, but these steps are modified by certain added critical steps and limitations that are essential to the invention and will be described below.

The prior known basic steps, applicable in the present invention, comprise: (1) preparing batch material consisting essentially of, on an analytical oxide basis, $ZrO_2$ and CaO, the CaO being less than about 6 percent by weight of the material, (2) heating the material at firing temperature in the range of from temperature that at least causes sintering to and including temperature that causes melting of said material, and (3) thereafter cooling the material. Thus, as indicated, the known alternative procedures of reacting zirconia and calcia raw materials, viz either in the solid state (usually during sintering) or in the liquid state (by fusion or melting), to form the cubic phase are both useful in the present invention, although I prefer the solid state procedure, as will be described further below. Various raw materials, means and rates of heating and cooling, and means of molding the bodies, as ordinarily known or obviously suitable to skilled workers in this art for making sintered or fused products of any given size and shape, are applicable, but not critical, to the present invention, subject to the limitation requirements noted below.

For the process according to this invention, the aforesaid basic steps are modified by the addition of the following critical steps and limitations: (a) proportioning the CaO with the $ZrO_2$ in the preparation of the batch material to yield a CaO content therein of 2 to 5 percent (preferably 3 to 4 percent) by weight of the material, (b) the firing temperature being at least 1800° C., (c) interrupting the cooling of the material at a temperature, which I choose to call an annealing temperature, within a range of from 900° C. to 1700° C. (particularly with advantageous results from 1250° C. to 1350° C.) and maintaining the material at this annealing temperature for at least about one day, and (d) thereafter continuing the cooling of the material according to the basic cooling step.

The amount of calcia is critical. Less than 2 weight percent CaO leaves too much monoclinic-tetragonal zirconia with the result that large numbers of bodies are destroyed or rendered unusable because of cracking during manufacture. More than 5 weight percent CaO leaves too little or no monoclinic-tetragonal zirconia to constitute the required microstructure for significant property improvements according to this invention. About 3.5 weight percent CaO yields the optimum proportioning of cubic phase to monoclinic (tetragonal) phase for optimum improvement in strength and elastic properties.

I have also determined that a firing temperature of at least 1800° C. is critical because, when using lower firing temperatures, the subsequent annealing step, i.e. step (c) above, fails to produce the required precipitate structure for significant property improvement. It is apparent that inadequate $ZrO_2$ is dissolved in the cubic phase at firing temperature below 1800° C.

Especially critical to the invention is the interrupting of the basic cooling step for performing the annealing step. My research has shown that merely carrying out the basic cooling step as in the past (to about room temperature) and then reheating to a temperature in the range of 900–1700° C. does not produce the precipitate structure of my invention. It is only when the basic cooling step is interrupted at a temperature in a corresponding temperature range and maintained thereat for at least about one day that the necessary precipitate structure is developed. Moreover, even interrupted cooling anneal at temperatures below 900° C. are ineffective to provide the essential new structure because the kinetics of precipitation are too slow or inhibited. Above 1700° C., solid solution equilibrium is such that insufficient or not precipitation occurs to give any significant improvement in properties. About 1300° C. annealing gives about the optimum quantity of precipitate at a fairly rapid rate. Usually at least about 1 day is required to yield enough precipitate, even at a temperature as low as 900° C., to cause a significant improvement in properties. For practical purposes, 5 days or so is about the maximum useful annealing time because longer times do not provide any significant further precipitation although they do not cause any adverse effects. Optimum time at about 1300° C. is about 2 days.

There are several specific variants of the foregoing generally defined process of making bodies according to the present invention. First, the one I prefer to use involves preparing a finely divided batch mixture (of any usual particle sizing known to be or obviously suitable for the desired fired density, etc.) consisting essentially of monoclinic zirconia and calcia as individual raw material components, molding that mixture by any one of the many conventional or known ceramic processing techniques (e.g. slip casting, dry pressing, extrusion, isostatic pressing, injection molding, etc.) to form a green body, firing the green body at sintering temperature of at least 1800° C. but below the melting point of the mixture (preferably 1850° C. to 1950° C.) until sintering thereof has been effected and the calcia has combined with part of the zirconia to form a cubic crystalline phase, and thereafter cooling and annealing the sintered body as described hereinabove. As part of this preferred variant of the invention process, I find it beneficial to provide calcia in the batch mixture by a heat decomposable compound whose solid decomposition product (at least at sintering temperature) is substantially all CaO (e.g. oxalate, acetate, nitrate, fluoride, sulfate, carbonate, hydroxide, etc., of calcium). Also, for maximum fired density, I have found it beneficial to heat the batch mixture, prior to molding thereof, to a prefiring temperature within a range of 900° C. to 1300° C. (preferably 1050° C. to 1150° C.) for at least about 1 day and thereafter cooling the mixture to prepare it for molding.

A second variant involves melting a mixture of monoclinic zirconia and calcia, solidifying the melt and crushing it to a finely divided state to form the batch material to be employed in the further steps according to the first variant of the process. Optionally, the finely divided fused batch material may be the commercial partially stabilized material formed from electrically melted mixtures of zircon, calcium oxide and coke.

As a third variant, a fusion-cast refractory or body can be formed by pouring a melt of proper composition (as in the second variant) into a suitable preformed mold (e.g. of graphite or water-cooled metal) and substantially solidifying it therein, and thereafter cooling and annealing the casting as previously described herein. If desired, the resultant, cooled, cast product can be used as such, can be cut up into smaller bodies, or can be crushed to finely divided grain that can be molded (as in the first variant) and sintered at a temperature no greater than 1700° C. without loss of the improvement afforded by the annealing step during cooling of casting prior to crushing.

DESCRIPTION OF THE PREFERRED EMBODIMENTS

Example 1.

A batch mixture was prepared from 1448 grams of commercial high purity zirconia powder and 165 grams of reagent grade calcium acetate monohydrate powder. The zirconia powder had an average particle size of 0.6–0.8 micron and had a reported purity (including $HfO_2$ as is conventional) of 99.7 weight percent (principal impurity being 0.2 weight percent CaO). The calcium acetate monohydrate powder was also of a very similar fine particle size and had a reported purity of 99.4 weight percent. These powders were blended by rolling in a jar mill for 1 hour, after which the mixture was heated to a prefiring temperature of 1100° C. for 24 hours.

In preparing the batch mixture for molding, polyethylene glycol wax having an average molecular weight of 15,000–20,000 (sold under the trademark Carbowax 20M) in an amount of 2 percent by weight of the batch mixture was dissolved in chlorethene and thoroughly mixed into the batch mixture as a binder by lightly ball milling with alumina balls for 1 hour. The chlorethene was then evaporated and the resulting molding mixture was granulated by passing it successively through 10 Tyler mesh and 20 Tyler mesh screens. Next, 4 inches × 1 inch × ¾ inch bars were lightly pressed from the granulated molding mixture at 3000 p.s.i. in a steel mold. These bars were then isostatically pressed at 20,000 p.s.i.

In beginning the firing operation, the wax was burnt out by heating the pressed bars at 25° C. per hour to 600° C. and holding there for 4 hours. Then, they were further heated to 1900° C. in 28 hours and held there for 2 hours. Thereafter, the fired bars were cooled to 1300° C. in 6 hours, at which temperature they were annealed for 48 hours. Following this anneal, the bars were then cooled to room temperature in 13 hours.

Examination of fired and annealed bars showed that they were free of visible cracks and their microstructure consisted essentially of cubic grains as the volumetrically major constituent, a small amount of smaller (approx. 10–20 microns) primary intergranular monoclinic zirconia grains and finely divided (about 0.1–2 microns), vermicular (in a pattern like a Widmanstatten structure), monoclinic zirconia precipitate dispersed intragranularly throughout all the cubic grains, as shown by optical microscopy and X-ray diffraction. Densities of these bars were in excess of 95 percent of theoretical.

For strength and elastic property comparison, another alot of bars of the older type, conventional zirconia partially stabilized with 3.5 weight percent CaO were prepared from the same raw materials in the same proportions and fabricated in the same way as the foregoing basis according to this invention, except that these conventional bars were sintered at 1750° C. and thereafter cooled to room temperature without interruption. Cubic grains formed the volumetrically major microstructural constituent of these bars with smaller primary monoclinic zirconia grains randomly scattered in the grain boundaries of adjacent cubic grains, but no monoclinic zirconia precipitate was detected in the cubic grains.

Twenty-four sintered bars were selected from each of the two lots prepared as noted above and machined to dimensions of 2½ inches × ¾ inch × ¼ inch. These resulting test bars were arranged in groups of three of the same lot. A group of each lot, without further treatment, was tested at room temperature to determine MOR, and a similar pair of groups was tested at room temperature to determine MOE. Of the remaining 36 test bars, two groups of each lot was heated to a different predetermined temperature and held there for about 30 minutes to assure temperature uniformity throughout each test bar. Thereafter, each reheated test bar was plunged halfway, along its longest dimension, into water initially at room temperature, with the remaining end surrounded by room temperature air, and held in that position until the entire bar was cooled substantially to room temperature. One group of each lot from each thermal shock treatment was tested at room temperature to determine MOR and, likewise, one group of each lot from each thermal shock treatment was tested at room temperature to determine MOE. The average values for each group are set forth in the table, which point up the improvement provided by the present invention.

TABLE

| Thermal treatment temp., ° C. | Average MOR×$10^3$ p.s.i. | | Average MOE×$10^6$ p.s.i. | |
|---|---|---|---|---|
| | Annealed bars | Conventional bars | Annealed bars | Conventional bars |
| Room | 19.0 | 6.3 | 23.2 | 14.4 |
| 816 | 9.0 | 3.1 | 18.0 | 6.0 |
| 954 | 8.1 | 3.0 | 17.1 | 5.4 |
| 1,038 | 8.5 | 2.8 | 18.0 | 4.6 |

Example 2.

A sample body was prepared and fired substantially the same as the annealed bars in example 1; however, instead of interrupting the cooling from the 1900° C. firing temperature, the cooling was continuous down to room temperature. Thereafter, this body was reheated to 1300° C. and held there for 48 hours, followed by cooling to room temperature again. Examination of this cooled body showed the microstructure to consist essentially only of the cubic grains as the volumetrically major constituent and intergranular primary monoclinic zirconia grains, but no monoclinic zirconia precipitate in the cubic grain was found. Accordingly, the body is characterized by strength and elastic properties similar to that of the conventional bodies of zirconia partially stabilized with a like amount of CaO and that are not reheated as in this example. The results of this example demonstrate the critical nature of the interrupted cooling feature of this invention.

Example 3.

A sample body prepared substantially the same as the annealed bars in example 1, but with the firing temperature being 1800° C., showed the same type of improved structure and properties although the amount of precipitate appeared to be slightly less with a corresponding small reduction in strength and elastic property values. Density was also in excess of 95 percent of theoretical. When samples are similarly prepared but with the batch mixture prefiring temperature being as low as 900° C. or as high as 1300° C., densities of 90 percent of theoretical or greater are obtainable. However, lowering the prefiring temperature to 800° C. or increasing it to 1400° C. tends to yield densities of less than 90 percent of theoretical.

Example 4.

When preparing sample bodies substantially the same as the annealed bars in example 1, but with the annealing temperature-time being either 1000° C. for 5 days or 1600° C. for 2 days, the resulting structure will be substantially the same improved microstructure as in the annealed bars of example 1, and the MOR and MOE values will be not more than about 25 percent less than those in the table.

Similar specific property and structure improvements will be obtained when preparing bodies according to this invention by fusion-casting or by sintering fused grain so long as the material of the resultant body has been subjected to the prescribed interrupted cooling anneal.

I claim:

1. A partially stabilized zirconia body consisting essentially of $ZrO_2$ and CaO on an analytical oxide basis, said CaO being 2 to 5 percent by weight of said body,
   having a crystalline microstructure consisting essentially of cubic grains composed essentially of said CaO and part of said $ZrO_2$, and primary monoclinic zirconia grains randomly dispersed substantially at the grain boundaries between adjacent cubic grains, said cubic grains collectively being the major microstructural phase by volume,
   wherein the improvement, which effects greatly enhanced strength and elastic properties, comprises
   wherein the improvement, which effects greatly enhanced strength and elastic properties, comprises
   an extremely finely divided precipitate of monoclinic zirconia dispersed intragranularly throughout said cubic grains.

2. The body of claim 1 wherein
   said cubic grains are composed essentially of a solid solution $ZrO_2$ in a compound of the formula $CaZr_4O_9$,
   the average grain size of said primary monoclinic zirconia grains is substantially smaller than the average grain size of said cubic grains,
   the improvement further comprises
   said precipitate being vermicular and having an average grain size substantially smaller than the average grain size of said primary monoclinic zirconia grains.

3. The process of making a partially stabilized zirconia body comprising
   preparing batch material consisting essentially of, on an oxide basis, $ZrO_2$ and CaO, said CaO being 2 to 5 percent by weight of said material,
   heating said material at firing temperature in the range of from at least 1800° C. to and including temperature that causes melting of said material, and
   thereafter cooling said material,
   wherein the improvement comprises
   interrupting the cooling of said material at an annealing temperature within a range of from 900° C. to 1700° C. and maintaining said material at said annealing temperature for at least about 1 day, and
   thereafter continuing said cooling of said material.

4. The process of making a partially stabilized zirconia body comprising
   preparing a finely divided batch mixture consisting essentially of monoclinic zirconia and calcia, said calcia being 2 to 5 percent by weight of said mixture,
   molding said mixture to form a green body,
   firing said green body at sintering temperature of at least 1800° C., but below the melting point of said mixture until sintering thereof has been effected and the calcia has combined with part of said zirconia to form a cubic crystalline phase, and
   thereafter cooling the sintered body,
   wherein the improvement comprises
   interrupting the cooling of said sintered body at an annealing temperature within a range of from 900° C. to 1700° C. and maintaining said sintered body at said annealing temperature for at least about 1 day, and
   thereafter continuing said cooling of said sintered body.

5. The process of claim 3 wherein said sintering temperature is within the range of from 1850° C. to 1950° C.

6. The process of claim 3 wherein said annealing temperature is within the range of from 1250° C. to 1350° C.

7. The process of claim 3 wherein said calcia is provided by a heat decomposable compound whose solid decomposition product is substantially all CaO.

8. The process of claim 3 wherein said CaO content is 3 to 4 percent by weight of said mixture.

9. The process of claim 3 wherein the improvement further comprises, prior to said molding thereof, heating said mixture to a prefiring temperature within a range of 900° C. to 1300° C. for at least about 1 day and thereafter cooling said mixture.

10. The process of claim 9 wherein said prefiring temperature is within the range of from 1050° C. to 1150° C.

* * * * *